United States Patent [19]

Rumbaugh et al.

[11] Patent Number: 4,979,235

[45] Date of Patent: Dec. 18, 1990

[54] POLARIZATION CONTROLLER FOR USE IN OPTICAL FIBER COMMUNICATION SYSTEM

[75] Inventors: Scott H. Rumbaugh, Lake Oswego; Michael D. Jones, Portland; Philip J. Bos, Beaverton, all of Oreg.

[73] Assignee: Tektronix, Inc., Beaverton, Oreg.

[21] Appl. No.: 339,281

[22] Filed: Apr. 17, 1989

[51] Int. Cl.$^5$ .............................................. H04B 10/06
[52] U.S. Cl. ................................... 455/616; 455/619; 350/372
[58] Field of Search ................ 455/616, 619; 350/372

[56] References Cited

U.S. PATENT DOCUMENTS 4,752,120  6/1988  Shimizu ............................... 455/616

FOREIGN PATENT DOCUMENTS 0250819  1/1988  European Pat. Off. ............ 455/616

OTHER PUBLICATIONS

Rysdale, "Method of Overcoming Finite Range Limitation of Certain State of PC devices in Automatic Polarization Control Schemes", Electronic Letters 1-16-86, vol. #2.

Okoshi, "Recent Advances in Coherent Optical Fiber Communications Systems", Journal of Lightwave Tech, vol. LT-5, No. 1, 1-87, pp. 44-52.

Mahon, "Compensation Deformation, New Endless Control Schemes for Hot/Homodyne Receiver which Require no Mechanical Drives" 12th European Conference on Optical Communications Tech Digest, 9-2-2-87, vol. 1, pp. 267-270.

Alferness, "Electrooptic Guided-Wave Device for General Polarization Transformations", Journal of Quantum Electronics, vol. QE-17, No. 6, Jun. 1981, pp. 965-969.

Siddiqui et al., "Liquid Crystal Polarization Controller for Use in Fiber Communication Systems," OFC '89/Wednesday Poster/122.

Walker et al., "Endless Polarization Control Using Four Fibre Squeezers", Electronic Letters, vol. 22, No. 6, 1987.

Primary Examiner—Joseph A. Orsino
Assistant Examiner—L. Van Beek
Attorney, Agent, or Firm—John D. Winkelman; Alan K. Aldous

[57] ABSTRACT

A state-of-polarization (SOP) control system (10) uses a SOP controller (28) that is responsive to a CPU (24) to perform endless and complete polarization signal detection for a fiber optic communication system. The SOP controller (28) comprises liquid crystal variable optical retarders (40, 42 and 44) that adjust the polarization state of local optical signal (36) in response to voltages provided by the CPU (24). The CPU (24) adjusts the voltage applied to the retarders (40, 42, and 44) separately in response to the magnitude of an interference signal (70), which corresponds to the degree to which the polarization of the local optical signal (36) and an input optical signal (12) are different.

15 Claims, 6 Drawing Sheets

POLARIZATION CONTROLLER FOR USE IN OPTICAL FIBER COMMUNICATION SYSTEM

TECHNICAL FIELD

The present invention relates to optical communication systems and, in particular, to a polarization controller comprising multiple liquid crystal devices to provide endless polarization control in the coherent detection of an optical signal propagating through an optical communication system.

BACKGROUND OF THE INVENTION

State-of-polarization control systems have applications with fiber sensors, interferometry and optical communications systems. The following background information is presented herein only by way of example with reference to a polarization controller for use in an optical fiber communication system.

One type of conventional optical fiber communication system employs a single-mode fiber that transmits a light beam emitted by a narrow spectral linewidth semiconductor laser. An optical modulator modulates the light beam in accordance with an electrical message signal at baseband frequencies to form a modulated optical signal that propagates through the single-mode fiber. The polarization state of the modulated optical signal typically changes over time at the communication system receiver as a result of thermal or mechanical disturbances or stresses undergone by the fiber or as a result of inherent birefringence of the fiber. For example, a linearly polarized transmitted optical signal typically becomes generally elliptically polarized by the time it reaches the receiver. Such changes in polarization state require compensation to enable the use of a coherent detection receiver. The cost and drawbacks of using conventional polarization-maintaining fiber preclude its use in practical communication systems and plain coherent detection schemes. However, the polarization state of a signal in a single-mode fiber varies slowly enough to permit polarization compensation.

A state-of-polarization matching scheme may be implemented in a variety of ways and can be incorporated into existing fiber optic networks. Two basic approaches for controlling the polarization state of a signal are (1) matching the polarization state of a locally generated signal with that of the received communication signal and (2) separately detecting the two orthogonal polarization components of the received communication signal and adding them together after appropriate polarization compensation.

Combinations of these approaches generally employ two or more controlling elements to compensate for the number of degrees freedom of a polarization state, i.e., the ellipticity and tilt angle. The controlling elements previously employed in polarization controllers include electromagnetic fiber squeezers, electrooptic crystals, rotatable fiber coils, rotatable quarter-wave and half-wave plates, Faraday rotators, and rotatable fiber cranks.

Each of these polarization controllers suffers from varying degrees of insertion loss, mechanical fatigue, and other disadvantages, which are more fully described by Okoshi, "Polarization-State Control Schemes for Heterodyne or Homodyne Optical Fiber Communications," *Journal of Lightwave Technology,* IEEE Vol. LT-3, No. 6, December, 1985. Other disadvantages associated with the polarization controllers are their high cost and need for high operating voltages.

Two polarization controllers that are capable of providing endless control are rotatable wave plates and rotatable fiber cranks. Endless control is important because the fluctuation of the polarization state of a signal in a single-mode fiber is unpredictable. Thus, a state-of-polarization control element having a limited control range might require resetting. The resetting in conventional systems is generally accompanied by loss of the polarization state of the local optical signal and a consequent loss of information because of an inability to maintain continuous coherent detection. This loss can be substantial if the polarization state of the received optical signal is near to or fluctuates about the critical range points of the polarization controller elements.

SUMMARY OF THE INVENTION

An object of the present invention is, therefore, to provide a polarization state controller for use in a optical communication system employing coherent detection.

Another object of this invention is to provide such a polarization controller that is capable of endless control.

A further object of this invention is to provide such a polarization controller that is relatively low cost and requires a relatively low operating voltage.

The present invention relates to a state-of-polarization control system for an optical system in which a detector develops a difference signal that is indicative of a difference between polarization states of an input optical signal and a local optical signal. The control system includes a polarization controller that controls the polarization of the local signal to control the difference in polarization between the local signal and input signal. The polarization controller includes first, second, and third liquid crystal devices that provide retardance values $\psi_z$, $\theta_p$, and $\theta_y$, respectively. A signal processor computes polarization data for the liquid crystal devices in response to the difference signal. The liquid crystal devices respond to the polarization data to minimize the difference between the polarization state of the input signal and local signal.

The control system operates in a normal mode and first and second reset modes. In normal mode, the first and second liquid crystal devices cooperate to change the polarization of the horizontally polarized local signal to any linear tilt polarization. In the normal mode, the third liquid crystal device provides any elliptical polarization state to the output of the second liquid crystal device. Further, the third liquid crystal device generally changes the tilt of the output of the second liquid crystal device. In the first and second reset modes, the third liquid crystal device is reset from an upper and lower limit, respectively, while the first and second liquid crystal devices provide an elliptical polarization state to the local signal. The control system is endless in that during reset modes no change occurs in the state-of-polarization of the local signal as it emerges from the third liquid crystal device. The tracking system of the present invention is explained with reference to the Poincare sphere.

Liquid crystal devices provide polarization control at a relatively low operating voltage and can be easily implemented in existing systems at a very low cost.

Additional objects and advantages of the present invention will be apparent from the following detailed description of a preferred embodiment thereof, which proceeds with reference to the accompanying drawings.

BRIEF DESCRIPTION OF THE DRAWINGS

FIGS. 4a, 5a, 6a, 7a, and 8a show plan views of the Poincare sphere. FIGS. 4b, 5b, 6b, 7b, and 8b show side views of the Poincare sphere.

DETAILED DESCRIPTION OF PREFERRED EMBODIMENT

Figure 1:
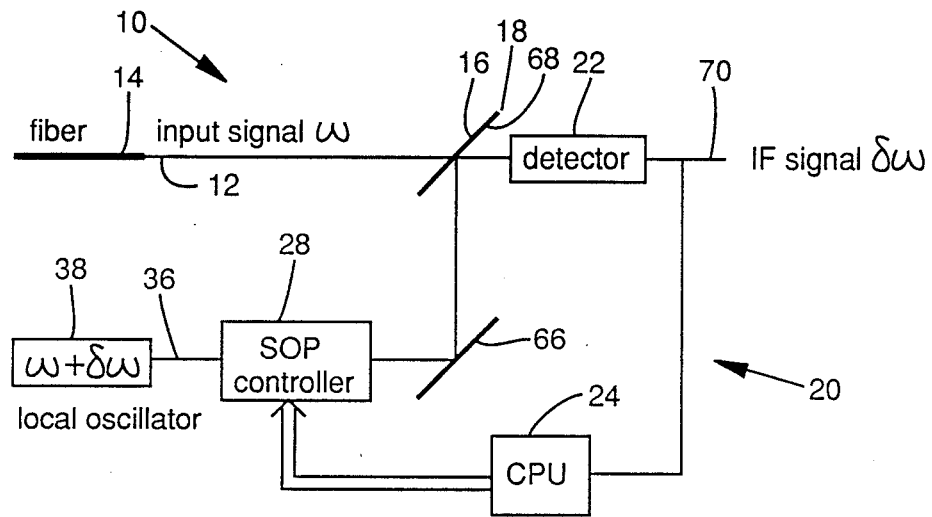
FIG. 1 is a system block diagram of a coherent detection receiver in which the polarization controller of the present invention minimizes the difference between an input optical signal and a locally generated optical source signal.

Referring to FIG. 1, a preferred embodiment of a state-of-polarization (SOP) control system 10 forms a portion of an optical communication receiver that performs coherent detection of an input optical signal 12 propagating from the output end of an optical fiber 14. SOP control system 10 is of the heterodyne type. The present invention may be used in any system that uses interference, such as an interferometer system. A preferred embodiment includes a communication receiver.

The input signal 12 exits optical fiber 14 and strikes a surface 16 of a half-silvered mirror 18, which functions as the input of a control loop 20. Control loop 20 includes a detector 22, a central processing unit (CPU) 24, and a SOP controller 28 that receives a local optical signal 36 from a local oscillator 38.

Input signal 12 has angular frequency $\omega$ and an arbitrary SOP. Local signal 36 has an angular frequency $\omega + \delta\omega$ and a nominally horizontal polarization. Alternatively, local signal 36 could be vertically polarized. The angular frequency $\delta\omega$ is defined as the offset frequency of the local signal 36 relative to the angular frequency $\omega$ of input signal 12.

Figure 2:
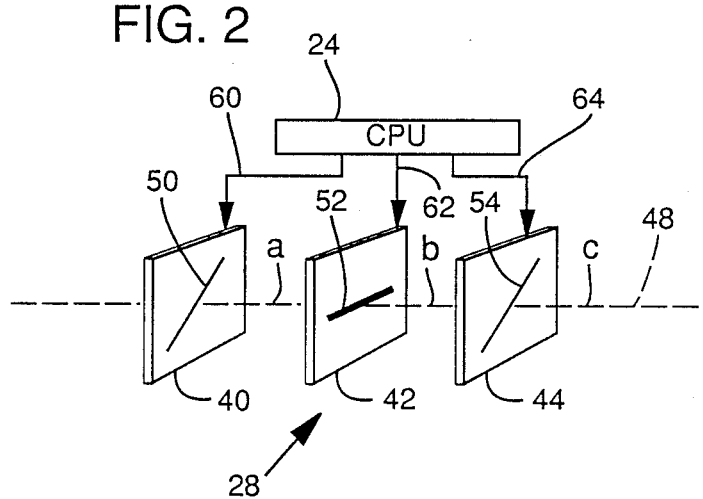
FIG. 2 is a diagram showing three liquid crystal cells forming a polarization controller that imparts a controlled amount of retardation to the locally generated signal to maintain coherent detection of the input signal.

Referring to FIG. 2, SOP controller 28 preferably includes three nematic liquid crystal variable optical retarders 40, 42, and 44 that are of the variable birefringent type. Local signal 36 propagates along optic axis 48, which intersects and is normal to the light communicating surfaces of retarders 40, 42, and 44. Points a, b, and c are used as reference points in describing the SOP of local signal 36 as it emerges from retarders 40, 42, and 44, respectively.

The relative alignment of fast axis 50, fast axis 52, and fast axis 54 is shown on retarders 40, 42, and 44, respectively. Alternatively, axes 50, 52, and 54 could be the slow axes of retarders 40, 42, and 44. Fast axes 50 and 54 are aligned 45° with respect to fast axis 52 and horizontally polarized local signal 36.

The retardance of liquid crystal retarders is a function of the alignment of the liquid crystal molecules, which is controlled by the intensity of an applied electric field. The retardance of retarder 40 is denominated $\psi_z$. The retardance of retarder 42 is denominated $\theta_p$. The retardance of retarder 44 is denominated $\theta_y$. The intensities of the electric fields applied to retarders 40, 42, and 44 change in response to voltage signals appearing at the respective outputs 60, 62, and 64 of CPU 24. Any combination of values of retardance $\psi_z$, $\theta_p$, and $\theta_y$ may be obtained by varying the magnitudes of the applied voltage signals.

To achieve coherent detection of input signal 12, SOP control system 10 tracks the polarization of input signal 12 by changing the retardance imparted to local signal 36 by retarders 40, 42, and 44. The polarization of local signal 36 may be any desired value by producing a corresponding combination of retardances $\psi_z$, $\theta_p$, and $\theta_y$. This change in polarization of local signal 36 is achieved in the following manner.

Referring again to FIG. 1, local signal 36 propagates through SOP controller 28, reflects off a mirror 66, and strikes the surface 68 of half-silvered mirror 18. As an alternative to the configuration of FIG. 1, mirrors 18 and 66 could be replaced by a fiber optic directional coupler. Input signal 12 propagates through mirror 18, and local signal 36 reflects off mirror 18. Both input signal 12 and local signal 36 strike detector 22, which is preferably a photo-detector. Photodetectors are inherently square law devices such that the only time-varying signal detected is the interference (IF) signal 70 of frequency $\delta\omega$. The amplitude of IF signal 70 is determined by the amplitude of local signal 36 and how closely the polarization of local signal 36 matches the polarization of input signal 12. The amplitude of IF signal 70 increases as the polarization difference between input signal 12 and local signal 36 decreases.

SOP controller 28 minimizes the polarization difference between input signal 12 and local signal 36 by systematically varying the SOP of local signal 36 until the voltage of IF signal 70 is a maximum. Once the voltage of IF signal 70 is a maximum, SOP controller 10 continues to vary the SOP of local signal 36 to follow changes in input signal 12.

SOP control system 10 continuously modifies the SOP of local signal 36 to minimize the difference between the SOP of input signal 12 and local signal 36. Changes in the amplitude of IF signal 70 are the only feedback used to determine how to modify the SOP of local signal 36. SOP control system 10 is complete in that SOP controller 28 can produce all possible polarization states in local signal 36 as it emerges from retarder 44 at point c. SOP control system 10 is endless in that no change in the SOP at point c occurs during the reset of any of finite range retarders 40, 42, and 44.

Figure 3:
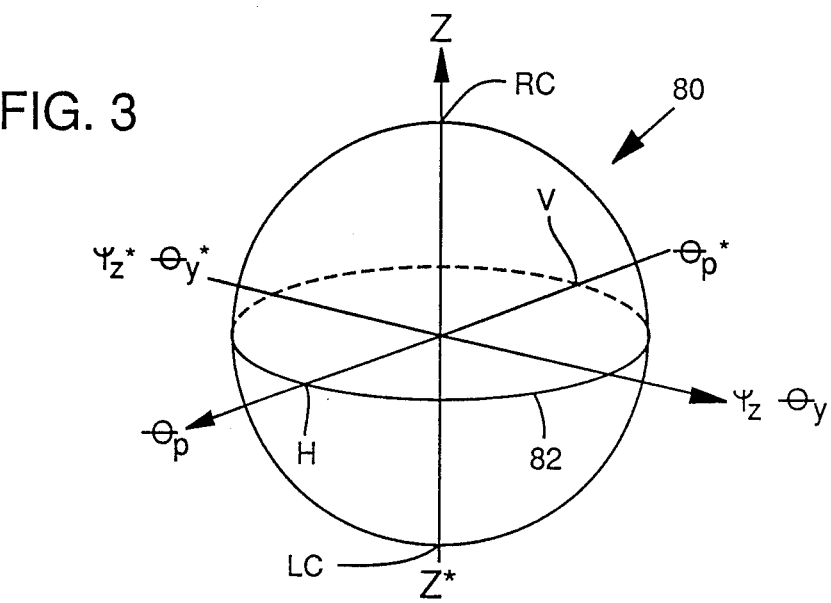
FIG. 3 shows the Poincare sphere, which is useful for describing the operation of the polarization controller of the invention.

The method of varying the polarization of local signal 36 may be explained in connection with the Poincare sphere 80, which is shown in FIG. 3. Referring to FIG. 3, the Poincare sphere 80 is a unit-radius spherical surface on which each point represents a different polarization form. Every point on the equator 82 represents linear polarization in a different polarization direction. Point H on the equator represents horizontally polarized light, and point V, which is diametrically opposed to point H, represents vertically polarized light. Elliptical polarization is represented by any point on the sphere located off the equator 82. The north pole and south pole represent right-circular (RC) and left-circular (LC) polarization, respectively. The Poincare Sphere is described in W. A. Shurcliff and S. S. Ballard, *Polarized Light*, 1964, pp. 71-76, and Born & Wolf, *Principles of Optics*, 1980, section 1.4, p. 31. In FIG. 3, the $z-z^*$, $\psi_z-\psi_z^*$, and $\theta_p-\theta_p^*$ axes are perpendicular to each other. The symbol * denominates a conjugate, i.e., an orthogonal counterpart. For example, $z^*$ is a conjugate of z. The $\theta_y-\theta_y^*$ axis is collinear with the $\psi_z-\psi_z^*$ axis.

The Jones vector $\vec{E}_c$, which describes the SOP of the electric field of local signal 36 at point c, is determined by multiplying the Jones vector of the SOP of local signal 36 as it emerges from local oscillator 38 by the Jones matrices for each device in an order opposite to that in which they appear in the system. $\vec{E}_c$ is described with linear algebraic matrix multiplication in equation 1 below:

$$\vec{E}_c = \begin{vmatrix} \cos(\theta_y/2) & i\sin(\theta_y/2) \\ i\sin(\theta_y/2) & \cos(\theta_y/2) \end{vmatrix} \begin{vmatrix} e^{i\theta_p/2} & 0 \\ 0 & e^{-i\theta_p/2} \end{vmatrix}$$
$$\begin{vmatrix} \cos(\psi_z/2) & i\sin(\psi_z/2) \\ i\sin(\psi_z/2) & \cos(\psi_z/2) \end{vmatrix} \begin{vmatrix} 1 \\ 0 \end{vmatrix}$$
$$= \begin{vmatrix} \cos P \cos(Z+Y) + i\sin P\cos(Z-Y) \\ \sin P \sin(Z-Y) + i\cos P \sin(Z+Y) \end{vmatrix} \quad (1)$$

where $P=\theta_p/2$, $Y=\theta_y/2$, and $Z=\psi_z/2$.

Jones vector and jones calculus are described in W. A. Shurcliff, *Polarized Light: Production and Use*, 1966, pp. 23-29, 91, and 118-123, and W. A. Shurcliff and S. S. Ballard, *Polarized Light*, 1964, pp. 80-82 and 93-95.

Three control algorithms (normal mode and two reset modes) are used to endlessly maintain the polarization match between input signal 12 and local signal 36, and determine the values of $\psi_z$, $\theta_p$, and $\theta_y$ to use in equation (1). Equation (1) may be used to explicitly determine the polarization state at point c. Determining the polarization state at point c is not necessary in using the invention. CPU 24 calculates voltages in the manner described in connection with the flowcharts of FIGS. 9, 10, and 11.

Normal Mode of Operation

Under normal operation of a preferred embodiment, $\theta_p=\pm\pi/2$, which is an illustrative case of $(4n\pm 1)\pi/2$ where n is any integer. Liquid devices do not switch between positive and negative values of retardance. However, $\pi/2$ is a special case of $(4n+1)\pi/2$ and $-\pi/2$ is a special case of $(4n-1)\pi/2$. The use of $\pm\pi/2$ is for mathematical simplicity. When the invention is implemented with liquid crystals, other values such as $\theta_p=\pi/2$ and $3\pi/2$ are preferred. The polarization matching is accomplished by altering $\psi_z$ and $\theta_y$. Since their axes 50 and 52 are displaced by 45°, retarders 40 and 42 operate as a single unit that effectively rotates the SOP of local signal 36 as it propagates between local oscillator 38 and point b. This changes the SOP in rotational directions about the $z-z^*$ axis of the Poincare sphere 80. Retarders 40 and 42 are referred to as the rotator analog. Retarder 44 controls the ellipticity and additional tilt of local signal 36 by changing the SOP in rotational directions about the $\theta_y-\theta_y^*$ axis on the Poincare sphere 80.

The Jones vector for local signal 36 exiting retarder 42 at point b in FIG. 2 is described with linear algebraic matrix multiplication in equation (2) below:

$$\vec{E}_b = \begin{vmatrix} e^{i\theta_p/2} & 0 \\ 0 & e^{-i\theta_p/2} \end{vmatrix} \begin{vmatrix} \cos(\psi_z/2) & i\sin(\psi_z/2) \\ i\sin(\psi_z/2) & \cos(\psi_z/2) \end{vmatrix} \begin{vmatrix} 1 \\ 0 \end{vmatrix}$$
$$= e^{i\theta_p/2} \begin{vmatrix} \cos(\psi_z/2) \\ e^{i(\pi/2-\theta_p)}\sin(\psi_z/2) \end{vmatrix}, \quad (2)$$

where $\vec{E}_b$ represents the electric field vector of local signal 36 at point b.

The $e^{i\theta_p/2}$ term is an absolute phase term that has no effect on the polarization and will be disregarded. For $\theta_p=\pi/2$, the Jones vector at point b is described in equation (3) below:

$$\vec{E}_b = \begin{vmatrix} \cos(\psi_z/2) \\ \sin(\psi_z/2) \end{vmatrix}. \quad (3)$$

For $\theta_p=-\pi/2$, the Jones vector at point b is described in equation (4) below:

$$\vec{E}_b = \begin{vmatrix} \cos(\psi_z/2) \\ -\sin(\psi_z/2) \end{vmatrix}. \quad (4)$$

Equations (3) and (4) above indicate, therefore, that restricting the voltage signal at output 62 of CPU 24 to binary values corresponding to retardation values of $\theta_p=\pm\pi/2$, provides a linear SOP at point b. Under these conditions, the value of $\psi_z$ determines the polarization direction or tilt of local signal 36 exiting retarder 44. Whenever $\psi_z=n\pi$, where n is any integer, the polarization at point a matches one of the two eigenstates of $\theta_p$, which are linear polarizations in the same plane as the fast and slow axes of retarder 42. In the case where $\psi_z=n\pi$, changes in $\theta_p$ have no effect on the SOP of local signal 36 at point b.

The polarization tilt at point b may be rotated endlessly and continuously if the direction of control of $\psi_z$ is reversed at its range limit (0 or $\pi$) and $\theta_p$ is switched to its complementary value. The range limits may be defined as $n\pi$ and $(n+1)\pi$ where n is any integer. In a preferred embodiment, 0 and $\pi$ are chosen as range limits for illustrative purposes. During normal operation, therefore, the combination of retarders 40 and 42 function as a polarization rotator with infinite range. The polarization tilt at point b is $\psi_z/2$ for $\theta_p=\pi/2$, and $-\psi_z/2$ for $\theta_p=-\pi/2$. The combination of retarders 40 and 42 together with retarder 44 provide complete control of the polarization so that any SOP of local signal 36 can be produced at the output of SOP controller 28.

During the normal mode of operation, SOP control system 10 maximizes the voltage of IF signal 70 by minimizing the polarization difference between input signal 12 and local signal 36. The SOP of input signal 12 typically changes extremely slowly relative to the rate at which the SOP of local signal 36 may be changed by CPU 24.

In a preferred embodiment, the polarization difference of input signal 12 and local signal 36 is minimized in the following manner. The SOP of local signal 36 can be represented by a point at a particular location on the Poincare sphere 80. A change in location on the Poincare sphere 80 corresponds to a change in the SOP of local signal 36. The SOP of input signal 12 is represented on the Poincare sphere 80 as a single point. The voltage signals provided at outputs 60 and 62 of CPU 24 change the retardation amounts of the respective retarders 40 and 42 and thereby change the position of the SOP of local signal 36 by incremental amounts on the Poincare sphere 80. During normal mode, the voltage on output 62 is either one of two voltage corresponding to $\theta_p = \pm \pi/2$.

If this change in SOP results in an increase in the magnitude of IF signal 70, then the change took place in the correct direction on the Poincare sphere 80. If this change in SOP results in a decrease in the magnitude of IF signal 70, then the position of the SOP of local signal 36 should be moved in the opposite direction. The position is incrementally changed until a change results in a decrease in the magnitude of IF signal 70. The position is then changed by one increment point in the opposite direction. In a preferred embodiment, CPU 22 alternates changes in the control voltages on outputs 60 and 64 in order to track the SOP of input signal 12. The control voltage on output 62 is either one of two voltages corresponding to $\theta_p = \pm \pi/2$ in order to maintain endless rotation of the linear polarization at point b.

The voltage signal provided at output 64 of CPU 24 changes the retardation amount of retarder 44 and thereby changes the position of the SOP of local signal 36 by incremental amounts on the Poincare sphere 80. The direction of change in retardation of retarder 44 remains the same as long as the magnitude of IF signal 70 increases as a result of the change. If a change in the position results in a decrease in the magnitude of IF signal 70, then the position is changed in the opposite direction.

An example of the operation of SOP control system 10 is shown in connection with FIGS. 4a and 4b through FIGS. 8a and 8b. FIGS. 4a, 5a, 6a, 7a, and 8a show a plan view of the Poincare sphere 80 at times $t_o$ to $t_4$. FIGS. 4b, 5b, 6b, 7ib, and 8b show a side view of the Poincare sphere at time $t_o$ to $t_4$. Point LO indicates the SOP of local signal 36 as it enters retarder 40. Symbols a, b, and c indicate the SOP of local signal 36 at points a, b, and c in FIG. 2. Dashed lines indicate the SOP of local signal 36 as it propagates from local oscillator 38 to point c in FIG. 2. The dashed lines are slightly displaced from their actual position for clarity of illustration. The SOP of input signal 12 is indicated at point "Input SOP." Points on the front side of the sphere are darkened while points on back side are shown as circles.

Table 1 shows the values of $\psi_z$, $\theta_p$, and $\theta_y$ for times $t_o$ to $t_4$ and whether IF signal 70 increased or decreased as a result of a change in the SOP of local signal 36. The symbols "$inc_z$" and "$inc_y$" represent increments to the retardation of retarders 40 and 44, respectively. The initial conditions of $\psi_z$, $\theta_p$, $\theta_y$ are arbitrary chosen to be $\pi/2$.

TABLE 1

| Time | $\psi_z$ | $\theta_p$ | $\theta_y$ | IF signal |
|---|---|---|---|---|
| $t_0$ | $\pi/2$ | $\pi/2$ | $\pi/2$ | — |
| $t_1$ | $\pi/2 + inc_z$ | $\pi/2$ | $\pi/2$ | Decrease |
| $t_2$ | $\pi/2 - inc_z$ | $\pi/2$ | $\pi/2$ | Increase |
| $t_3$ | $\pi/2 - inc_z$ | $\pi/2$ | $\pi/2 + inc_y$ | Increase |

TABLE 1-continued

| Time | $\psi_z$ | $\theta_p$ | $\theta_y$ | IF signal |
|---|---|---|---|---|
| $t_4$ | $\pi/2 - 2(inc_z)$ | $\pi/2$ | $\pi/2 + inc_y$ | Increase |

Figure 4A:
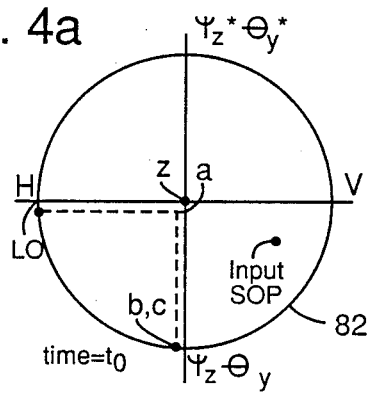
FIGS. 4a and 4b, through FIGS. 8a and 8b show examples of polarization displacement paths of the locally generated optical signal on the surface of the Poincare sphere as the polarization controller functions to achieve a minimum polarization difference between the input and locally generated optical signals.
Figure 4B:
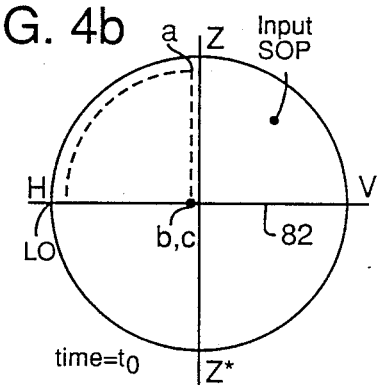

Referring to FIG. 4a, at time $t_0$, the SOP of local signal 36 is horizontally polarized at point LO as local signal 36 enters retarder 40. The SOP of local signal 36 at points a, b, and c is shown on FIG. 4a. FIG. 4b shows the SOP of local signal 36 at time $t_o$ at point LO and points a, b, and c in a side view on the Poincare sphere 80.

Figure 5A:
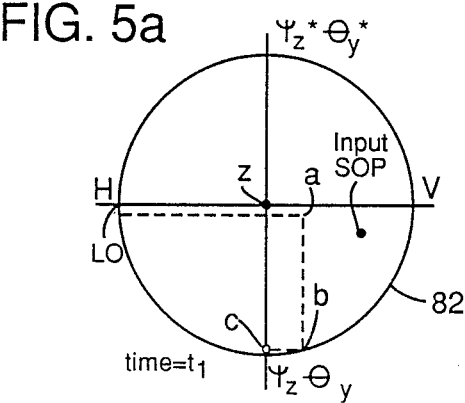
Figure 5B:
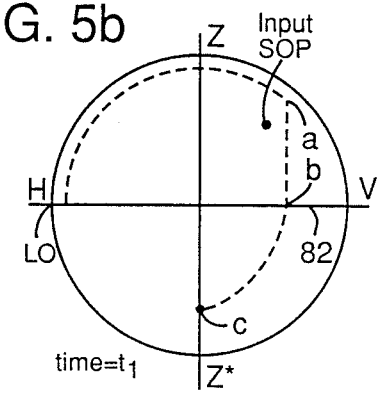

Referring to FIGS. 5a and 5b, at time $t_1$, the electric field across retarder 40 is incrementally changed such that $\psi_z$ increases from $\pi/2$ to $\pi/2 + inc_z$. The resulting changes in SOP are shown at points a, b, and c in the plan view FIG. 5a and side view of FIG. 5b. Point c is on the back side of the sphere in FIG. 5a. The increment in $\psi_z$ resulted in a decrease in the magnitude of IF signal 70 since point c in FIGS. 5a and 5b is farther from point Input SOP than it was in FIGS. 4a and 4b.

Therefore, $\psi_z$ should have been decremented rather than incremented.

Figure 6A:
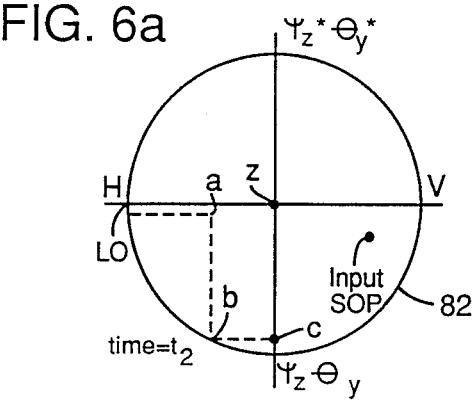
Figure 6B:
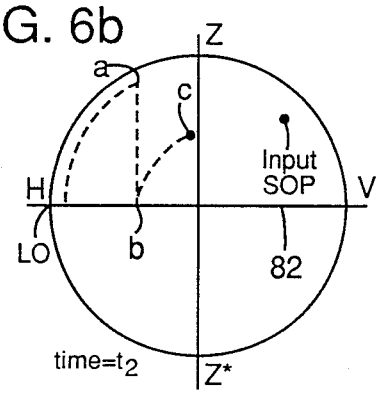

Referring to FIGS. 6a and 6b, $\psi_z$ is decremented from $\pi/2$ to $\pi/2 - inc_z$. The resulting changes in the SOP at points a, b, and c are shown at time $t_2$ in the plan view of FIG. 6a and the side view of FIG. 6b. Since point c in FIGS. 6a and 6b is closer to point Input SOP than it was in FIGS. 4a and 4b, the change in $\psi_z$ was in the correct direction.

Figure 7A:
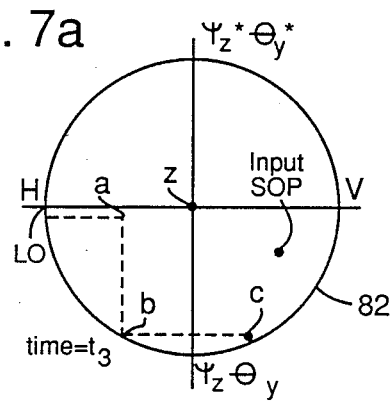
Figure 7B:
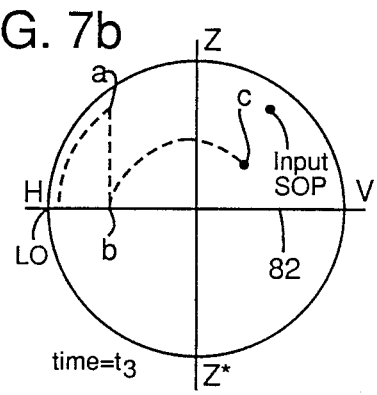

Referring to FIGS. 7a and 7b, at time $t_3$, $\theta_y$ is incremented from $\pi/2$ to $\pi/2 + inc_y$. The resulting changes in the SOP at points a, b, and c are shown at time $t_3$ in the plan view of FIG. 7a and the side view of FIG. 7b. Since point c in FIGS. 7a and 7b is closer to point Input SOP than it was in FIGS. 6a and 6b, the change in $\theta_y$ was in the correct direction.

Figure 8A:
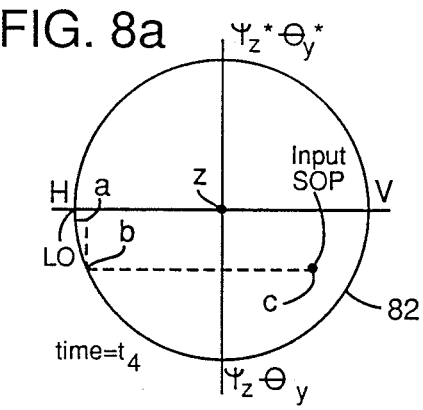
Figure 8B:
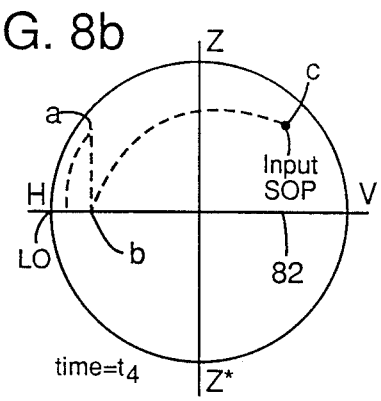

Referring to FIGS. 8a and 8b, at time $t_4$, $\psi_z$ is decremented from $\pi/2 - inc_z$ to $\pi/2 - 2(inc_z)$. The resulting change in the SOP at points a, b, and c are shown at time $t_4$ in the plan view of FIG. 8a and the side view of FIG. 8b. Point c is very close to point Input SOP. The polarization difference in local signal 36 and input signal 12 is minimized, causing IF signal 70 to be maximized.

SOP control system 10 will continue to dither the values of $\psi_z$ and $\theta_y$ to follow changes in the SOP of input signal 12. The value of $\theta_p$ is changed to its complimentary value according to the algorithm of FIG. 9. To the extent the SOP of input signal 12 remains constant over time after the difference in polarization is minimized, SOP control system 10 alters $\psi_z$, $\theta_p$, and $\theta_y$ in a predictable manner, such that there can be a determinable difference between the SOP of input signal 12 and the SOP of local signal 36.

In the foregoing example, SOP control system 10 took four time periods to track point Input SOP. In practice, the incremental values are preferably so small (e.q., $\pi/50$) that it would take many more time periods to track point Input SOP. The dashed lines on FIGS. 4a and 4b through FIGS. 8a and 8b do not show exact incremental values, but rather are intended to be merely illustrative.

Figure 9:
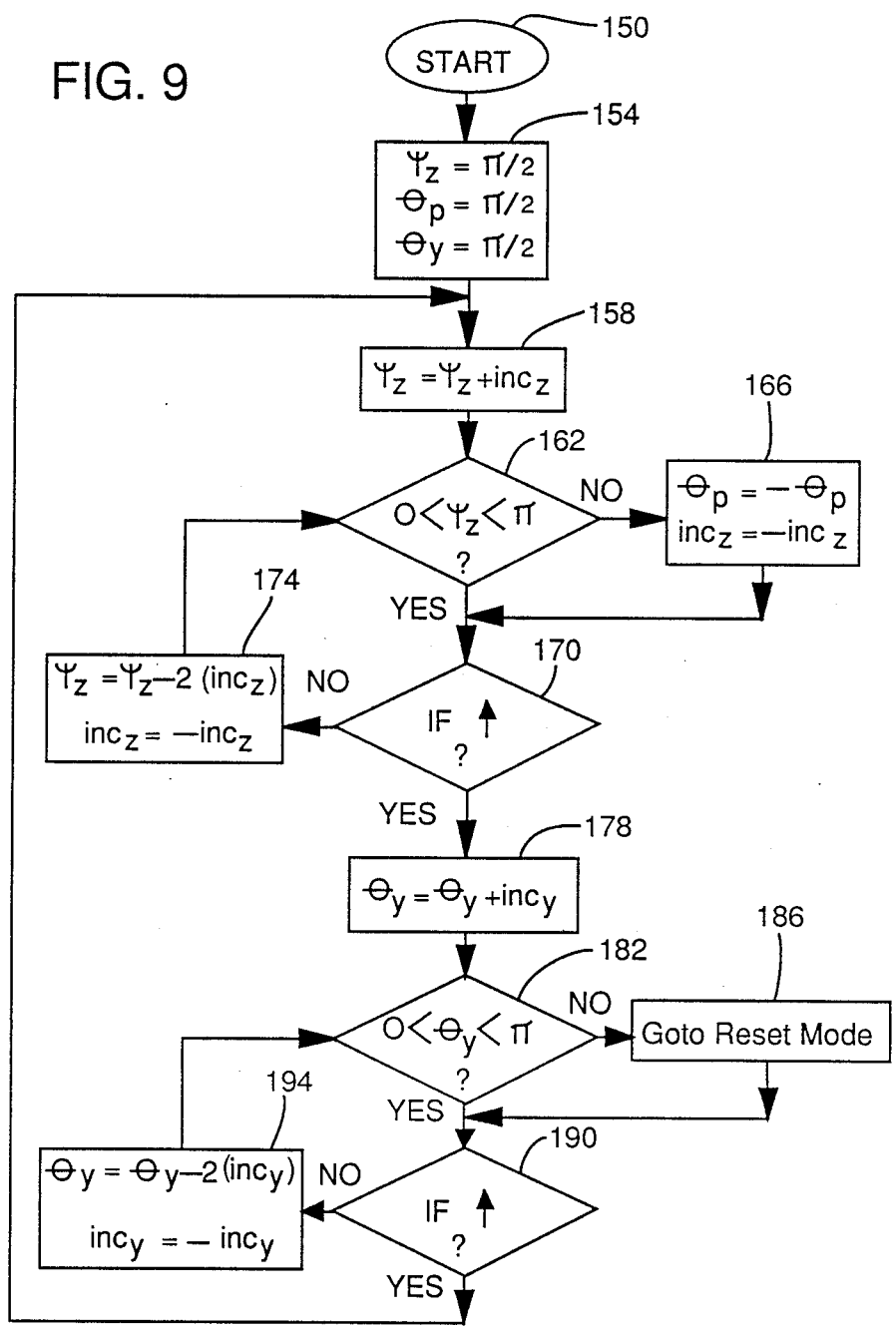
FIG. 9 is a flowchart of the processing steps associated with the normal operating mode of the invention.

FIG. 9 shows a flowchart of the operation of SOP control system 10 in the normal mode of operation. The operation starts at start box 150. CPU 24 has no information concerning the direction in which the SOP of local signal 36 should be changed. The initial values of $\psi_z$, $\theta_p$, and $\theta_y$ are arbitrarily chosen to be $\pi/2$, as is represented in operation box 154.

Operation box 158 represents an incremental change in $\psi_z$ such that $\psi_z = \psi_z + inc_z$ (using computer language representation). Decision box 162 represents a determination of whether $0 < \psi_z < \pi$. In practice, $\psi_z$ will not go outside of the range $0 < \psi_z < \pi$, since as soon as $\psi_z$ would reach 0 or $\pi$, the value of $\theta_p$ is changed to $-\theta_p$ and the direction of change in $\psi_z$ is switched. For example, if $\psi_z$ is increasing toward $\pi$, just as it reaches $\pi$, $\psi_z$ begins to decrease in value. If the answer to decision box 162 is negative, then $\theta_p = -\theta_p$, and $inc_z = -inc_z$, as is represented in operation box 166. The choice of $0 < \psi_z < \pi$ is arbitrary. It could have been any interval of $\pi$ with boundaries defined as $n\pi$ and $(n+1)\pi$ where n is any integer.

Decision box 170 represents a determination of whether the change in $\psi_z$ resulted in an increase in the magnitude of IF signal 70. If the answer to decision box 170 is negative, then $\psi_z = \psi_z - 2(inc_z)$ and $inc_z = -inc_z$, as is represented in operation box 174, and control is returned to decision box 162.

The polarization is then changed such that $\theta_y = \theta_y + inc_y$, as represented in operation box 178. It is then determined whether $0 < \theta_y < \pi$, as is represented in decision box 182. Again, $0 < \theta_y < \pi$ could be replaced by any interval of $\pi$ with boundaries defined as $n\pi$ and $(n+1)\pi$ where n is any integer. If the answer to decision box 182 is negative, then one of two reset modes are selected, depending on whether $\theta_y$ is at an upper or lower boundary, as is represented in operation box 186. The reset modes are described in connection with FIGS. 10 and 11.

Decision box 190 represents a determination of whether the modification to $\theta_y$ results in an increase in the magnitude of IF signal 70. If the answer to decision box 190 is negative, then $\theta_y = \theta_y - 2(inc_y)$ and $inc_y = -inc_y$, as is represented in operation box 194 and control is returned to decision box 182. SOP control system 10 then increments $\psi_z$ again, as is represented in operation box 158, and SOP control system 10 follows the flowchart of FIG. 9.

Reset Modes

The rotator analog has infinite range and under normal operation requires no reset. The retardation value $\theta_y$ will, however, periodically reach either an upper or a lower range limit. If these limits are set to integral multiples of $\pi$, then $\theta_y$ may be increased or decreased by $\pi$, and the output polarization will be unchanged if retarders 40 and 42 are controlled appropriately. During this reset cycle, retarders 40 and 42 will no longer function as a rotator and the polarization at point b in FIG. 2 will not be linear. For clarity of illustration the upper and lower limits are chosen to be $\pi$ and 0.

The reset conditions are derived by assuming a constant polarization as determined by equation (1). When $\theta_y$ reaches its upper range limit of $\pi$, the SOP of local signal 36 is maintained while $\theta_y$ is set back to 0 if $\theta_p$ and $\psi_z$ obey equations (5) and (6) below:

$$\theta_p = \theta_{po} - M\cos^{-1}(\sin\psi_{zo}/\sin\psi_z) \tag{5}$$

where $M = 1$ for $0 \leq \psi_{zo} < \pi/2$ and $\theta_{po} = \pi/2$, or $\pi/2 \leq \psi_{zo} \leq \pi$ and $\theta_{po} = -\pi/2$; and $M = -1$ for $\pi/2 \leq \psi_{zo} \leq \pi$ and $\theta_{po} = \pi/2$, or $0 \leq \psi_{zo} < \pi/2$ and $\theta_{po} = -/2$, where $\psi_{zo}$ and $\theta_{po}$ are initial values of $\psi_z$ and $\theta_p$.

$$\theta_y = \pi - \cos^{-1}(\cos\psi_z/\cos\psi_{zo}) \tag{6}$$

where $\theta_{po}$ and $\psi_{zo}$ are the initial values of $\psi_p$ and $\psi_z$.

When the reset cycle is complete, $\theta_p = \theta_{po}$, $\psi_z = \pi - \psi_{zo}$, $\theta_y = 0$ and normal operation is resumed.

The values of $\theta_p$ and $\psi_z$ are determined by equations (7) and (8) when $\theta_y$ reaches its lower range limit of 0.

$$\theta_p = \theta_{po} + M\cos^{-1}(\sin\psi_{zo}/\sin\psi_z) \tag{7}$$

where M is determined as it was in equation (5).

$$\theta_y = \cos^{-1}(\cos\psi_z/\cos\psi_{zo}) \tag{8}$$

Although range limits of $\theta_y$ and $\psi_z$ are chosen to be 0 and $\pi$, the analysis may be easily extended for any limits which are integral multiples of $\pi$. This control algorithm is general and will work with any system of linearly birefringent devices.

Figure 10:
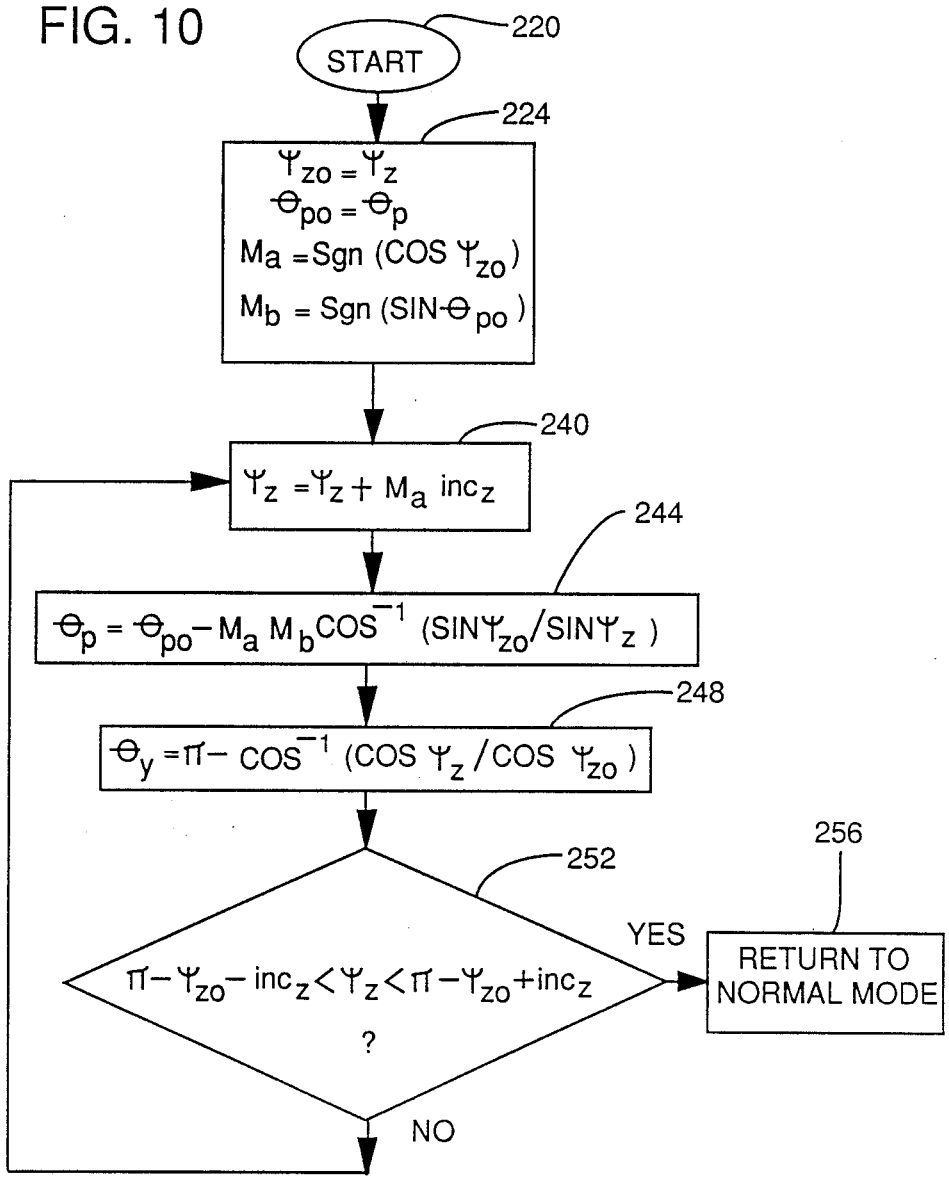
FIG. 10 is a flowchart of the processing steps associated with a first reset mode of the invention.

FIG. 10 shows a flowchart of the operation of SOP control system 10 in upper reset mode in which $\theta_y$ is reset from the upper limit, $\theta_y = \pi$. Upper reset mode starts at start box 220. Operation box 224 represents the assignment of values: $\psi_{zo} = \psi_z$, $\theta_{po} = \theta_p$, $M_a = \text{sgn}(\cos\psi_{zo})$, and $M_b = \text{sgn}(\sin\theta_{po})$.

Operation box 240 represents the assignment of value: $\psi_z = \psi_z + M_a inc_z$, where $inc_z$ is a positive increment. Operation box 244 represents the assignment of value: $\theta_p = \theta_{po} - M_a M_b \cos^{-1}(\sin\psi_{zo}/\sin\psi_z)$. Operation box 248 represents the assignment of value: $\theta_y = \pi - \cos^{-1}(\cos\psi_z/\cos\psi_{zo})$. Decision box 252 represents a determination of whether $\pi - \psi_{zo} - inc_z < \psi_z < \pi - \psi_{zo} + inc_z$. If the answer to decision box 252 is affirmative, SOP control system 10 returns to normal mode, as is represented in operation box 256. If the answer to decision box 252 is negative, SOP control system 10 changes the value of $\psi_z$, as is represented in operation box 240 and proceeds through upper reset mode as shown in the flowchart of FIG. 10.

Figure 11:
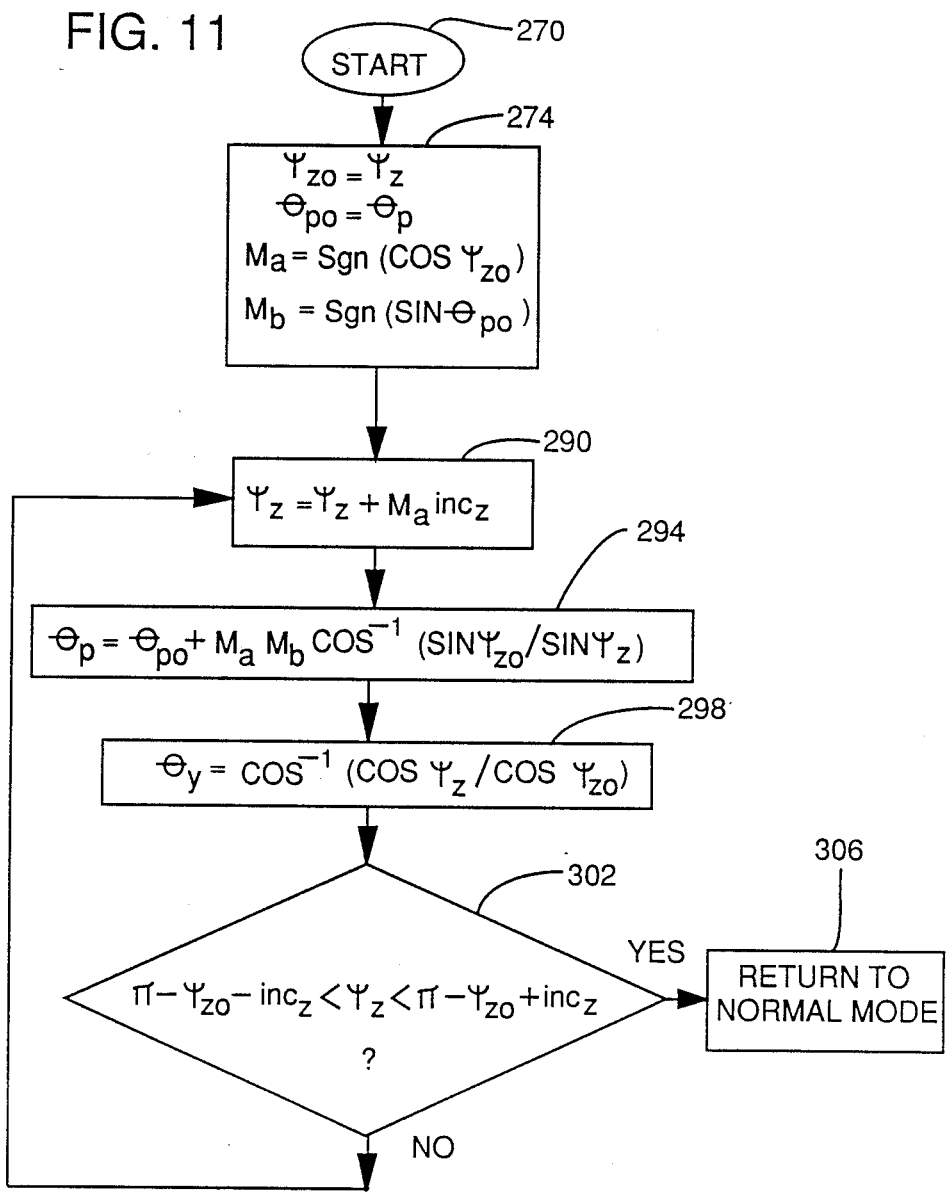
FIG. 11 is a flowchart of the processing steps associated with a second reset mode of the invention.

FIG. 11 shows a flowchart of the lower reset mode in which $\theta_y$ is reset from the lower limit, $\theta_y = 0$. Lower reset mode starts at start box 270. Operation box 274 represents the assignment of values: $\psi_{zo} = \psi_z$, $\theta_{po} = \theta_p$, $M_a = \text{sgn}(\cos\psi_{zo})$, and $M_b = \text{sgn}(\sin\theta_{po})$.

Operation box 290 represents the assignment of value: $\psi_z = \psi_z + M_a inc_z$. Operation box 294 represents the assignment of value: $\theta_p = \theta_{po} + M_a M_b \cos^{-1}(\sin\psi_{zo}/\sin\psi_z)$. Operation box 298 represents the assignment of value: $\theta_y = \cos^{-1}(\cos\psi_z/\cos\psi_{zo})$. Decision box 302 represents the determination of whether $\pi - \psi_{zo} - inc_z < \psi_z < \pi - \psi_{zo} + inc_z$. If the answer to decision box 302 is affirmative, then SOP control system 10 returns to normal mode, as is represented in operation box 306. If the answer is negative, then SOP control system 10 reassigns a new value to $\psi_z$, as is represented in operation box 290, and continues through lower reset mode, as shown in the flow chart of FIG. 11.

In the reset modes described in connection with FIGS. 10 and 11 and equations (5) through (8), $\theta_p$ and $\theta_y$ are calculated as a function of $\psi_z$ as $\psi_z$ is reset from $\psi_{zo}$ to $\pi - \psi_{zo}$. Alternatively, equations (5) through (8) may be solved as a function of $\theta_y$, in which case, $\psi_z$ and $\theta_p$ would be calculated in terms of $\theta_y$.

In the preferred embodiment, the SOP of local signal 36 is altered by SOP controller 28 and compared with input signal 12. Alternatively, SOP controller 28 may be arranged to alter the SOP of input signal 12. In this case, the altered SOP of input signal 12 would be compared with unaltered local signal 36. In the alternative configuration, the order of retarders 40, 42, and 44 would be reversed since the system is reciprocal.

It will be obvious to those having skill in the art that many changes may be made in the above described details of the preferred embodiment of the present invention without departing from the underlying principles thereof. The scope of the present invention should be determined, therefore, only by the following claims.

We claim:

1. A state-of-polarization control system for an optical system in which a detector develops a difference signal that is indicative of a difference between a first polarization state of a first optical signal and a second polarization state of a second optical signal, comprising:
    polarization control means including first, second, and third retarding devices for controlling the difference between the first polarization state of the first optical signal and the second polarization state of the second optical signal; and
    signal processing means responsive to the difference signal for computing polarization data to which the retarding devices of the polarization control means respond to minimize the difference between the first and second polarization states, the system including in a normal mode of operation during which the first retarding device provides a retardance $\psi_z$, and the second retarding device provides a retardance $\theta_p = (4n_1 \pm 1)\pi/2$, where $n_1$ is any integer, whenever $n_2\pi < \psi_z < (n_2+1)\pi$, where $n_2$ is any integer.

2. The system of claim 1 in which the second optical signal propagates through the first and second retarding devices, and the first and second retarding devices are of the variable optical retardation type and respond to the polarization data so that the first retarding device provides a first retardance value within one of plural ranges of retardation values and the second retarding device provides a second retardation value that determines the range within which the first retardation value lies to impart a corresponding polarization direction to the second optical signal propagating through the first and second retarding devices.

3. The system of claim 2 in which the second retarding device provides one of relatively few values of retardation to determine the range within which the first retardation value lies, and the first retarding device provides one of relatively many values of retardation to determine the first retardation value within the range.

4. The system of claim 2 in which the second retarding device provides two values of retardation and the first retarding device provides retardation $\psi_z$ where $n\pi < \psi_z < (n+1)\pi$, where n is any integer, to impart continuous rotation in either of two directions.

5. The system of claim 1 in which the third retarding device cooperates with the first and second retarding devices to provide a polarization state ellipticity and tilt control.

6. The system of claim 5 in which the first and second retarding devices cooperate to provide linearly polarized light to the third retarding device.

7. The system of claim 1 in which the first retarding device provides a retardance of value $\psi_z$ and the third retarding device provides a retardance $\theta_y$, and the polarization data are electrical signals that cause an incremental change in the value of $\psi_z$ and an incremental change in the value of $\theta_y$.

8. The system of claim 1 whereby the polarization control means and the signal processing means cooperate to provide tracking of the first polarization state so that there is a determinable difference between them.

9. The system of claim 1 in which the optical system is a communication system.

10. The system of claim 1 in which the first, second, and third retarding devices are liquid crystal devices.

11. A method for controlling the polarization of a first optical signal of an optical system, comprising the steps of:
    generating the first optical signal;
    propagating the first optical signal through first and second retarding devices;
    defining a first polarization state of the first optical signal;
    receiving a second optical signal having a polarization state;
    combining the second optical signal with the first optical signal on a detector;
    generating from the detector a difference signal indicative of a difference between the first polarization state of the first optional signal and the polarization state of the second optical signal;
    generating retardation signals that represent a change in the polarization state of the first optical signal from the first polarization state to a second polarization state in response to the difference signal;
    changing the retardances of the retarding devices in response to the retardation signals, the first retarding device providing a retardance $\psi_z$, and the second retarding device providing a retardance $\theta_p = (4n_1 \pm 1)\pi/2$, where $n_1$ is any integer, whenever $n_2\pi < \psi_z < (n_2+1)\pi$, where $n_2$ is any integer; and
    adjusting the polarization state of the first optical signal propagating through the retarding devices.

12. A state-of-polarization control system for an optical system in which a detector develops a difference signal that is indicative of a difference between a first polarization state of a first optical signal and a second polarization state of a second optical signal, comprising:
    polarization control means including first, second, and third retarding devices for controlling the difference between the first polarization state of the first optical signal and the second polarization state of the second optical signal; and
    signal processing means responsive to the difference signal for computing polarization data to which the retarding devices of the polarization control means respond to minimize the difference between the first and second polarization states, the system operating in a normal mode and first and second reset modes, such that in the normal mode the first and second retarding devices function to provide linear polarization and the third retarding device provides a retardance value $\theta_y$, where $n\pi < \theta_y < (n+1)\pi$ where n equals any integer; in the first reset mode, the first and second retarding devices provide elliptical polarization, and the third retarding device resets from a retardance value of $(n+1\pi$, where n is the integer used in normal mode; and in the second reset mode, the first and second retarding devices provide elliptical polarization, and the third retarding device provides a retardance value of $n\pi$, where n is the integer used in normal mode.

13. The system of claim 12 in which the second retarding device provides two values of retardation and the first retarding device provides retardation $\psi_z$ where $n\pi < \psi_z < (n+1)\pi$, where n is any integer, to impart continuous rotation in either of two directions.

14. The system of claim 12 in which the first retarding device provides a retardance of value $\psi_z$, and the polarization data are electrical signals that cause an incremental change in the value of $\psi_z$ and an incremental change in the value of $\theta_y$.

15. The system of claim 12 whereby the polarization control means and the signal processing means cooperate to provide tracking of the first polarization state so that there is a determinable difference between them.

* * * * *